United States Patent [19]

Kumm

[11] 4,024,772
[45] May 24, 1977

[54] VARIABLE SPEED FLAT BELT TRANSMISSION

[76] Inventor: Emerson L. Kumm, 1035 E. Laguna Drive, Tempe, Ariz. 85282

[22] Filed: May 10, 1976

[21] Appl. No.: 684,491

[52] U.S. Cl. .................... 74/230.16; 74/230.17 A; 74/230.17 F

[51] Int. Cl.² ........................................ F16H 55/52

[58] Field of Search ............... 74/230.16, 230.17 A, 74/230.17 D, 230.17 F, 230.17 R

[56] References Cited

UNITED STATES PATENTS

| | | | |
|---|---|---|---|
| 2,916,927 | 12/1959 | Opper | 74/230.17 F |
| 3,596,528 | 8/1971 | Dittrich et al. | 74/230.17 F |

FOREIGN PATENTS OR APPLICATIONS

| | | | |
|---|---|---|---|
| 926,122 | 5/1963 | United Kingdom | 74/230.17 R |

Primary Examiner—Edgar W. Geoghegan
Attorney, Agent, or Firm—Herschel C. Omohundro

[57] ABSTRACT

The subject transmission includes a pair of pulleys mounted for rotation on spaced parallel axes, each pulley having axially spaced sets of oppositely inclined guideways for adjustably receiving drive elements which engage the internal face of an endless flat belt extending around the pulleys and transmitting power from one to the other; one set of guideways on each pulley is axially movable relative to the other to adjust the drive elements toward and away from the pulley axis and vary the effective diameters of the pulleys thus changing the drive ratio of the transmission. Fluid pressure responsive actuators effect the relative movement of the guideways to change pulley diameters under a suitable control system which may be manual or automatic.

18 Claims, 7 Drawing Figures

VARIABLE SPEED FLAT BELT TRANSMISSION

BACKGROUND OF THE INVENTION

This invention relates generally to transmissions of the belt driven type and is more particularly related to the class of variable speed transmissions exemplified, in part, by the following patents: U.S. Pat. Nos. 3,479,908 to Kress et al.; 3,664,206 to Clauss, Jr.; 3,670,594 to Roper; 3,704,634 to Schrodt; 3,731,549 to Kaiser et al.; and 3,811,331 to Moogk.

Most of the transmissions of the patents enumerated above, as well as those of the rest of the prior art, utilize Vee-belts or variations thereof, such as link belts or chains, for transmitting power from one pulley to the other. This feature is in marked contrast to the thin, flat, flexible belt utilized in the present invention and which has numerous advantages to be pointed out more in detail hereinafter.

With present variable speed pulley drives of the type using Vee-belts, the latter are composed of a rubber composition and have a trapezoidal cross section, the belt transmitting rotary motion at one speed from a source of power, such as an engine or motor, to an output power shaft at another speed, the speed ratio being varied in a continuous fashion from a minimum to a maximum as dependent on the geometry of the belt and pulley system. The Vee-belt is compressed between smooth conical sheave sections in each of two pulleys by external axial forces on the sections to apply tension to the belt and friction between the sides of the Vee-belt and sheave sections to prevent slippage. In operation, a force unbalance caused by changes in the axial loading of the sheave sections causes the Vee-belt to change its radial positions in the two pulleys until a force balance is achieved or a limit range stop is reached. For a large transmitted torque the required axial force exerted on the sheaves results in a large compressive load on the Vee-belt, which requires the belt to have a substantial thickness to prevent axial collapse or failure of the belt. The increase in thickness increases its centrifugal force and causes higher belt tension loads. Also, as the belt thickness increases, pulley size must be increased due to higher stress loads at a given design minimum pulley radius. Further, the typical Vee-belt must continuously pull out from the compressive sheave load on leaving the pulley, which results in significant friction losses and belt fatigue, affecting overall efficiency and operating life. Consequently, although variable speed pulley drives have successfully used Vee-belts in a wide range of applications (industrial drives to snowmobiles and even automobiles) they have been severely limited in their power capabilities for more competitive smaller size equipment.

SUMMARY OF THE INVENTION

As mentioned, this invention pertains generally to variable speed, belt driven transmissions and more particularly to a drive using a thin flat belt trained around pulleys which are adjustable to vary the effective diameters and consequently the drive ratio of the transmission.

An object of the present invention is to provide a continuously variable transmission utilizing a flat belt and pulley members so constructed that power is transmitted to and from the inner surface of the belt and the pulley members can be adjusted to vary the effective diameters thereof and change the drive ratio of the transmission.

Another object of the invention is to provide a continuously variable transmission which avoids the objections of prior continuously variable transmissions that employ belts with heavy cross-sections which require high compressive loading, exert high resistance to withdrawal from the pulleys, are subjected to high centrifugal forces at high speed operation, and require relatively large diameter pulleys due to excessive resistance to bending.

Another object of the invention is to provide a continuously variable transmission having a novel pulley construction including relatively adjustable sets of inclined guides and drive elements adjustably received by the guides, the drive elements being shaped to engage the back or inner surface of the endless belt and transmit power to and receive power from the belt to effect rotation of the driven pulley.

A further object of the invention is to construct the guides and drive elements, mentioned in the preceding paragraph, in such a manner and of certain materials to facilitate the adjustment thereof in the operation of changing the effective sizes of the pulleys.

A still further object of the invention is to provide a pulley construction having oppositely inclined sets of guides with Tee-shaped cross sections and to provide the drive elements with relatively frictionfree head ends disposed in the guides with the Tee-shaped cross sections, the head ends having a close sliding fit in the guides to insure ease of adjustment during the change of effective size of the pulleys.

Another object of the invention is to provide a pulley construction of the type mentioned in the preceding paragraphs in which one set of guides is adjustable by a fluid pressure responsive mechanism and the guides of both sets are inclined at predetermined angles which will cause the drive elements to be forced toward or away from the axis of rotation of the pulley upon relative axial adjustment of the guide sets.

Still another object of the invention is to provide the drive elements mentioned in the preceding paragraphs with end plug inserts formed of a material to provide relatively friction free contact between the ends of the drive elements and the bottom surfaces of the Tee-shaped guide grooves so that minimum opposition will be offered to the movement of the drive elements during the adjustment of the guide sets in changing the effective diameters of the pulleys.

It is also an object of the invention to provide the drive elements, mentioned in the preceding paragraphs with substantially round cross sections and slightly longitudinally curved configuration so that the belt will be crowned when passing around the pulleys and caused to be centered thereon.

Other objects and advantages will be pointed out or made obvious by the following description of one form of transmission selected as an example of the invention and illustrated in detail in the accompanying drawings.

IN THE DRAWINGS

DESCRIPTION

Figure 1:
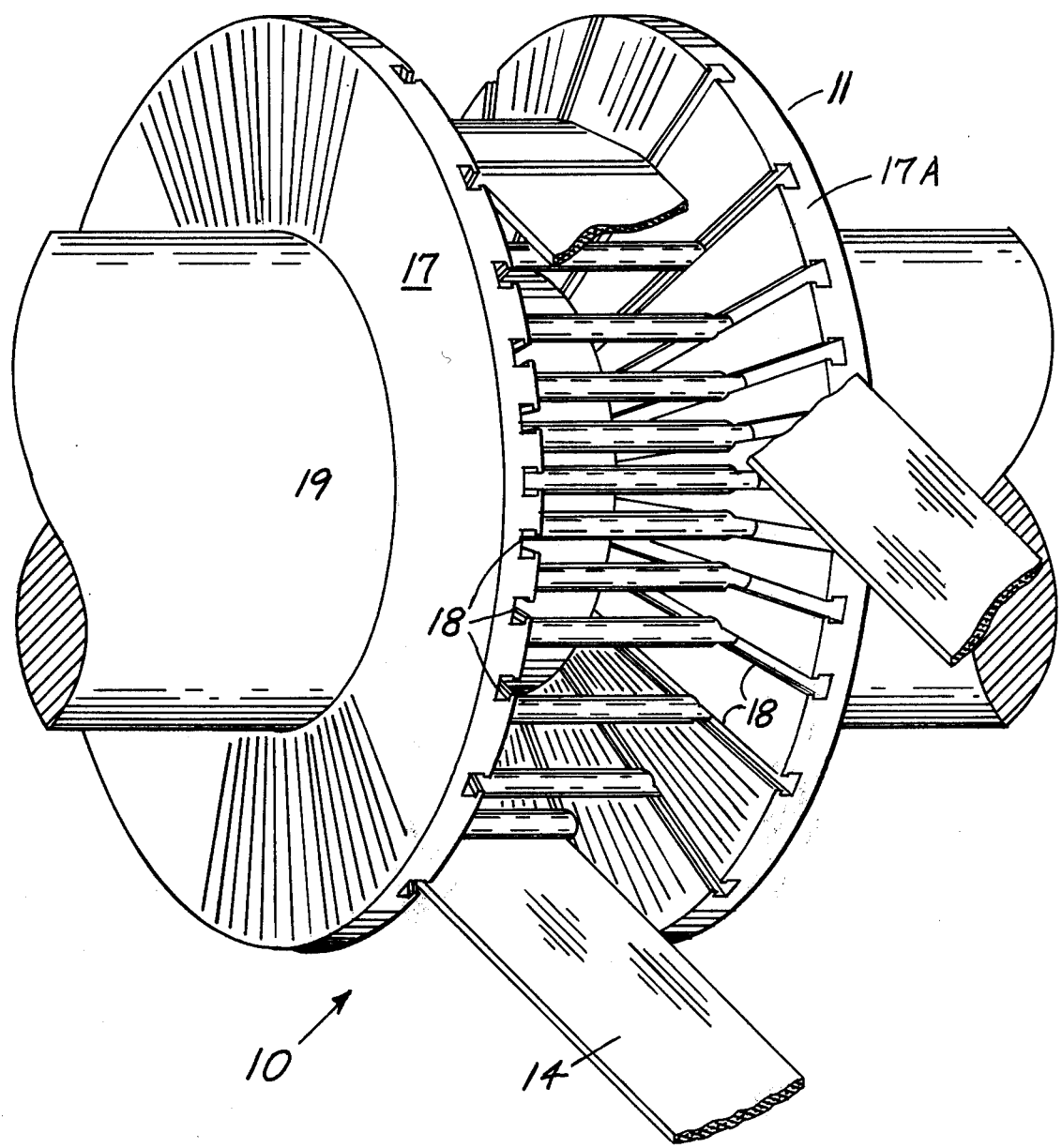
FIG. 1 is a perspective view of one pulley with a portion of a flat belt extending around it, the pulley being formed in accordance with the invention.
Figures 2, 3:
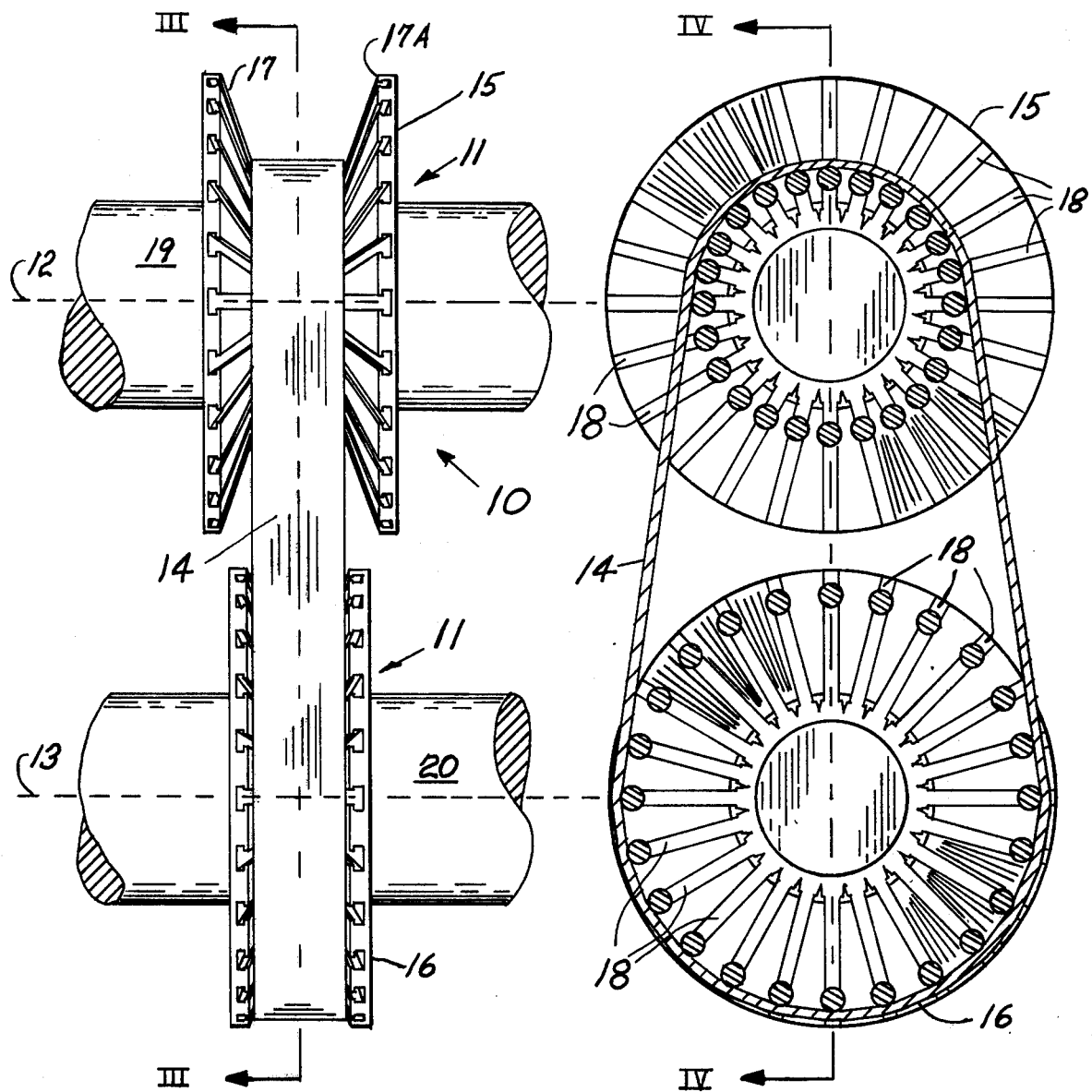
FIG. 2 is a side elevational view of a pair of pulleys employed in the transmission, the flat belt being trained around the pulleys.
FIG. 3 is a sectional view taken through the pulleys on the plane indicated by the line III—III of FIG. 2.
Figure 4:
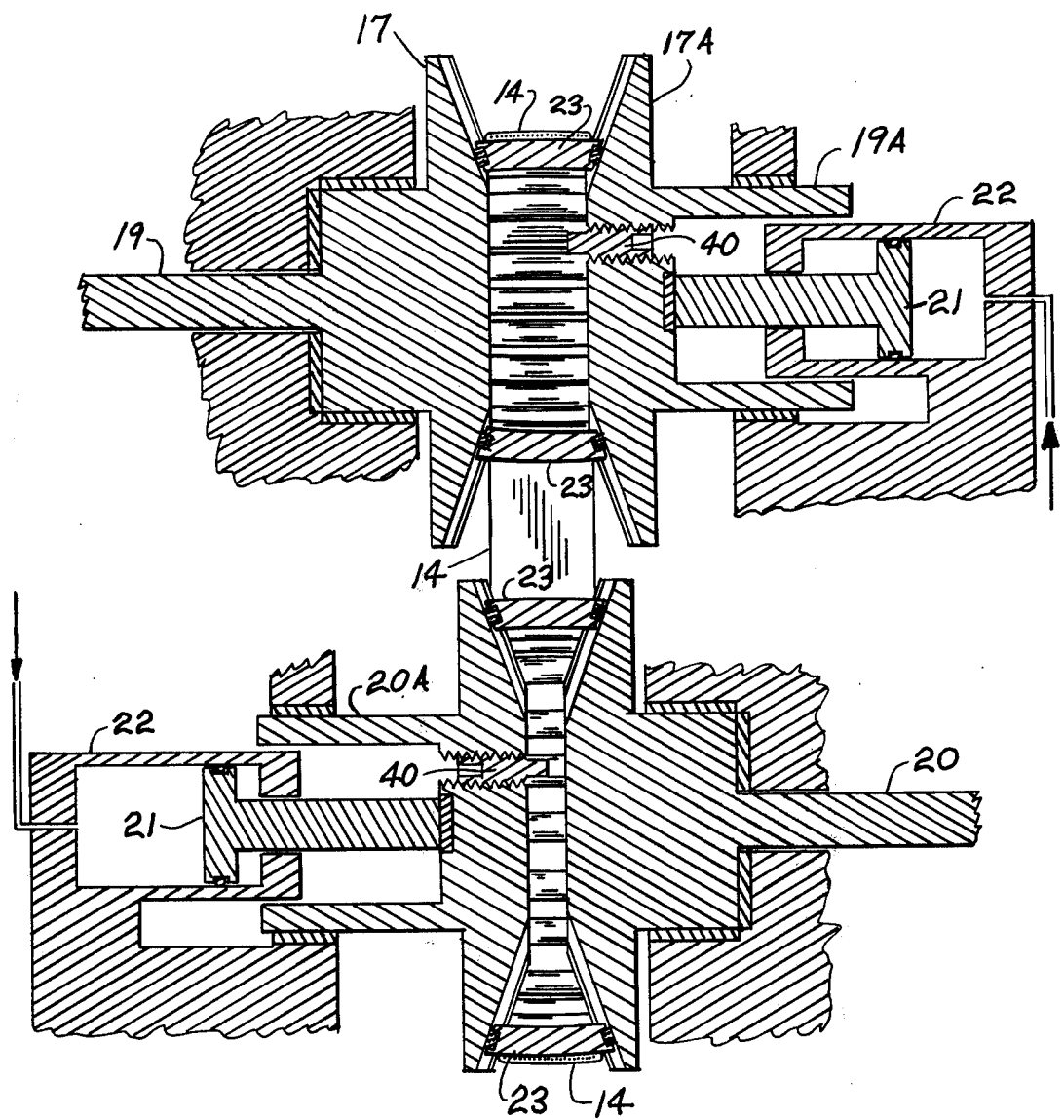
FIG. 4 is an axial sectional view taken through the pulleys on the plane indicated by the line IV—IV of FIG. 3.

More particular reference to the drawings discloses a transmission, generally designated by the numeral 10, having pulleys 11 mounted for rotation about spaced parallel axes 12 and 13 and having a flat belt 14 trained around the pulleys to transmit rotary motion from one, the driving pulley 15, to the other, the driven pulley 16. Pulleys 15 and 16 are substantially identical in construction, each having a pair of conical sheave sections 17, 17A, one of which is axially movable relative to the other for reasons which will be obvious from the following discussion. In this description, sheave sections 17, 17A are designated as guideways because each has a plurality of guide slots 18 extending from points spaced a predetermined distance from the axis to the periphery of the section. The sections or guideways are mounted on shafts 19 and 20 which, in turn, are supported for rotation in a suitable frame (not shown). Shaft 19 is connected in a suitable manner to a prime mover (not shown) while shaft 20 is also connected in a suitable manner to some element (not shown) which is to be driven at rates varying from that of the prime mover.

In the form of the invention shown, shafts 19 and 20 have additional separate complemental sections 19A and 20A which are axially movable relative to the main shaft sections 19 and 20 to adjust the sheave or guide sections thereon relative to the other or axially fixed sections. To effect relative axial movement between the axially fixed shafts and their complemental sections, the latter are formed with piston heads 21 disposed for movement in cylinders 22 in response to the introduction of fluid under pressure.

The sheave or guide sections 17 and 17A are provided with the guide slots 18 which, in the illustrated form of the invention, extend radially of the conical sections. Also in the form of the invention illustrated, the conical surfaces of the sheave sections in which the guide slots are formed are disposed at an angle of approximately 70° to the axes of rotation of the shafts 19, 19A and 20, 20A. The slots 18 are Tee-shaped in cross section and arranged in pairs in the axially fixed and complemental sheave sections. Such guide slots are arranged in such a manner to receive drive elements 23 for radial adjustment in the sheave sections in the operation of changing the effective diameters of the pulleys. Each drive element 23, in the form shown, is circular in cross section and is formed adjacent each end and on opposite sides with grooves 24 to provide heads for reception by the Tee-shaped guide slots. Each element 23 is also curved a slight degree longitudinally so that when the belt 14 is engaged with it under suitable force the belt will be crowned and any tendency to move to either side will be resisted.

Figure 5:
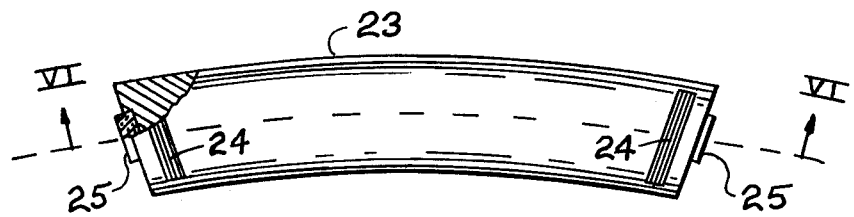
FIG. 5 is a detail side elevational view, partly in section, of a drive element employed in the transmission, the view being on a larger scale for clarity.
Figure 6:
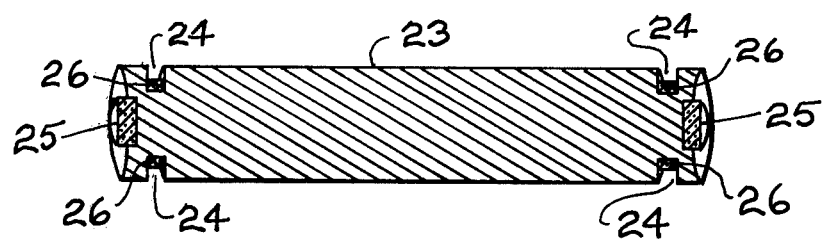
FIG. 6 is a detail axial sectional view taken through the drive element shown in FIG. 5, the view being taken on the line VI—VI of such FIG.
Figure 7:
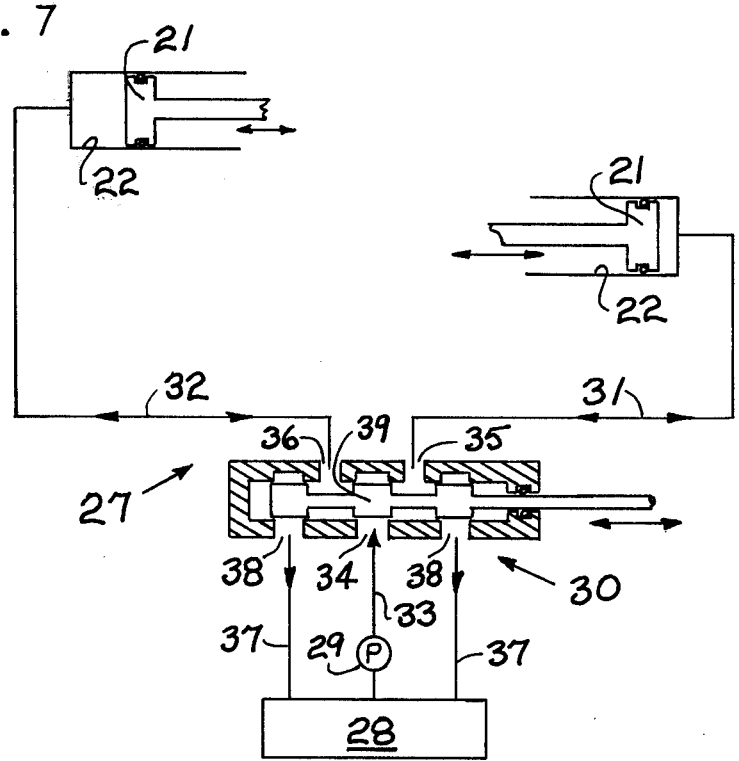
FIG. 7 is a schematic view showing a hydraulic circuit which may be used in the operation of changing the transmission ratio.

It will be observed that axial adjustment of the relatively movable sheave sections will vary the distance between the sections and cause or permit radial movement of the drive elements. When the sheave sections move apart the drive elements move, or may be moved, inwardly toward the axis of rotation of the pulley to reduce the effective size of the pulley. Movement of the sheave or guide sections toward one another permits the drive elements to move, or be moved, outwardly away from the pulley axis of rotation and increases the effective size of the pulley. From FIGS. 5 and 6 it will be seen that the drive elements have end plugs or inserts 25 disposed therein. These inserts are formed of a material, such as "DU" bearing material, which provides low friction between the inserts and the bottom walls of the guide grooves. As shown in FIG. 6, inserts 26 of such low friction material may also be embedded in the slots 24 for engagement with the flanges of the Tee-shaped guide slots 24 to further facilitate adjustment of the drive elements in the operation of changing the effective diameters of the pulleys.

Various types of mechanisms may be employed to control the adjustment of the pulleys in the operation of selecting the transmission ratio. For the present illustration, a hydraulic system 27 has been shown. Such system has a reservoir 28, a pump 29, a control valve 30, and lines 31 and 32 leading from the valve 30 to the cylinders 22. Pump 29 is in a line 33 leading from the reservoir 28 to inlet port 34 of the valve casing and lines 31 and 32 lead from cylinder ports 35 and 36 in the valve casing to the cylinders 22. Sump lines 37 extend from exhaust ports 38 to the reservoir. The valve casing receives a spool 39 which is movable to selectively connect inlet 34 with one or the other of cylinder ports 35 or 36 and the other to an exhaust port 38. Fluid under pressure supplied to a cylinder port will cause the piston therein to move the sheave section engaged therewith toward its complemental section. At the same time the other cylinder port will be connected with an exhaust port 38 to vent the other cylinder. This arrangement will permit the movable sheave section serviced thereby to move away from its complemental sheave section. As previously pointed out, when the sheave sections are moved toward one another the effective diameter of the pulley increases and vice versa. It should be obvious that the belt applies a load to the drive elements which tends to move them toward the pulley axis and as the distance between the sheave sections increases the drive elements move toward the pulley axis. Such loading of the belt also causes the drive elements of the pulley in which the sheave sections are moved toward one another to move outwardly or away from the pulley axis and increase the effective size of the pulley. The movement of the sheave sections toward one another is limited by adjustable stop screws 40.

While but a single form of transmission embodying the features of the invention has been shown and described it will be obvious to those skilled in the art that many minor variations may be made in the construction and relation of parts without departing from the spirit and scope of the invention as shown and described herein.

I claim:

1. A variable speed flat belt drive comprising:

a. a pair of pulley members mounted for rotary movement on spaced axes, each of said pulley members having axially spaced groups of circumferentially spaced guideways extending outwardly from points spaced a predetermined distance from the pulley axis, the guideways in opposed groups being arranged in pairs;

b. a plurality of drive elements having their end portions disposed for adjustment in the respective guideways of said pairs, said drive elements extending between said axially spaced guideway groups; and c. a flat belt trained around said pulley members with the inner surface of said belt engaging said drive elements to transmit torque from one pulley member to the other, adjustment of said drive elements in said guideways varying the effective diameters of said pulley members.

2. The variable speed flat belt drive of claim 1 in which one guideway of each group is inclined at a predetermined angle to the axis of rotation of its respective pulley member.

3. The variable speed flat belt drive of claim 2 in which the guideways of one group on a predetermined pulley member are inclined oppositely to the guideways of the other group on said pulley member.

4. The variable speed flat belt drive of claim 2 in which the predetermined angle of inclination of the guideways is substantially 70°.

5. The variable speed flat belt drive of claim 1 in which the end portions of the drive elements disposed in the guideways are provided with low friction pads.

6. The variable speed flat belt drive of claim 1 in which one group of guideways on each pulley member is axially movable relative to the other group of guideways on said pulley member.

7. The variable speed flat belt drive of claim 6 in which the axially movable group of guideways on one pulley member is on the opposite side of the belt from the axially movable group of guideways on the other pulley member.

8. The variable speed flat belt drive of claim 6 in which power means are provided to move the movable group of guideways on each pulley member.

9. The variable speed flat belt drive of claim 8 in which the power means for moving the movable group of guideways on one pulley member is on the opposite side of the belt from the power means for moving the movable group of guideways on the other pulley member.

10. The variable speed flat belt drive of claim 8 in which the power means provided to move the movable groups of guideways in fluid pressure responsive.

11. The variable speed flat belt drive of claim 6 in which means are provided to limit the extent of movement of said movable groups of guideways.

12. The variable speed flat belt drive of claim 1 in which the length of each drive element is greater than the width of the flat belt.

13. The variable speed flat belt drive of claim 5 in which the guideways have Tee-shaped cross sections.

14. The variable speed flat belt drive of claim 13 in which the drive elements are substantially bar-shaped and have grooves formed therein adjacent the ends to adjustably fit in the Tee-shaped guideways.

15. The variable speed flat belt drive of claim 14 in which the drive elements have low friction pads inserted in the ends for engagement with the bottom walls of the Tee-shaped guideways to facilitate adjustment of the drive elements.

16. The variable speed flat belt drive of claim 14 in which the drive elements are slightly curved longitudinally to cause a crowned effect on the belt to keep such belt centered on the pulleys.

17. The variable speed flat belt drive of claim 14 in which the grooves in the drive elements have predetermined surfaces provided with low friction coatings to facilitate movement of the drive elements in the guideways.

18. The variable speed flat belt drive of claim 8 in which control means are provided for the guideway moving power means to make one movable guideway move toward its stationary complemental guideway when the other movable guideway moves away from its stationary complemental guideway.

* * * * *